United States Patent
Allwright et al.

(10) Patent No.: US 6,839,360 B2
(45) Date of Patent: Jan. 4, 2005

(54) FIFO STORAGE INCLUDING POINTER MISALIGNMENT DETECTION

(75) Inventors: Gareth E. Allwright, St Albans (GB); Kam Choi, Tring (GB); Patrick Gibson, London (GB); Christopher Hay, South Harrow (GB); Jerome Nolan, Dublin (IE)

(73) Assignee: 3Com Corporation, Santa Clara, CA (US)

( * ) Notice: Subject to any disclaimer, the term of this patent is extended or adjusted under 35 U.S.C. 154(b) by 730 days.

(21) Appl. No.: 09/785,271

(22) Filed: Feb. 20, 2001

(65) Prior Publication Data

US 2002/0075887 A1 Jun. 20, 2002

(51) Int. Cl.[7] .................................................. H04L 12/54
(52) U.S. Cl. ........................ 370/429; 370/412; 710/154
(58) Field of Search ................................. 370/412, 429; 710/154; 709/228

(56) References Cited

U.S. PATENT DOCUMENTS

| | | | | |
|---|---|---|---|---|
| 4,679,191 A | * | 7/1987 | Nelson et al. | 370/355 |
| 5,375,142 A | * | 12/1994 | Pitot et al. | 375/224 |
| 5,608,869 A | * | 3/1997 | Hamstra et al. | 709/250 |
| 6,075,931 A | | 6/2000 | Panwar | 716/1 |
| 6,157,955 A | * | 12/2000 | Narad et al. | 709/228 |

* cited by examiner

Primary Examiner—John Pezzlo
(74) Attorney, Agent, or Firm—Nixon & Vanderhye P.C.

(57) ABSTRACT

A FIFO store for data packets and their respective status words includes space for the writing of a predetermined sync word or one of a cyclic sequence of predetermined sync words with each status word. The sync word can be used to prevent forwarding of a packet and as an aid to fault diagnosis if on reading the status word the sync word does not match any of the predetermined sync words.

2 Claims, 6 Drawing Sheets

FIFO STORAGE INCLUDING POINTER MISALIGNMENT DETECTION

FIELD OF THE INVENTION

This invention relates to the storage of data and associated information in a FIFO (first-in, first-out) store, particularly though not exclusively in network units such as switches and routers which include FIFO storage for the temporary storage of data packets.

BACKGROUND TO THE INVENTION

In a variety of contexts, such as multiport network units such as switches and routers, FIFO stores are extensively used for the temporary storage of data packets. FIFO stores may be provided in respect of each port or each group of ports of a unit and may be used to provide storage of a packet while, for example, a request to a central memory for the storage of the packet is being processed. However, there is quite a variety of circumstances in which it is desirable to retain the order in which packets were received, so that they are read out from storage in a corresponding order and for this reason FIFO stores are commonplace in switching and routing units and in a variety of other contexts.

FIFO stores are often based on static random access memory (SRAM) or dynamic random access memory (DRAM). Although FIFO stores were originally in hardware form, based essentially on the principles of the shift register, it is now customary to provide a FIFO store by defining a memory space in SRAM or DRAM and causing a set of pointers to re-circulate through the memory space. The pointers normally include a head pointer, which is stepped through the memory space and defines where new entries in the FIFO store should be written and a tail pointer which is likewise stepped through the memory space, though not necessarily in synchronism with the head pointer, and defines where readout of entries should occur. The software control of the FIFO can readily be employed to determine when the FIFO is full, when the distance (allowing for re-circulation) between the head and tail pointers in terms of discrete memory locations is at a defined maximum and to define an empty space when the tail pointer effectively catches up with the head pointer FIFO memories may also include other pointers employed, for example, for controlled discard of excessively aged data in the FIFO.

FIFO memories are now often embedded in application-specific integrated circuits (ASICs) and as clock speed and complexity in ASICs increase, the scope for operational difficulties also increases.

Broadly, in pointer controlled FIFO stores, especially those embedded in application-specific integrated circuits, suffer from two potential troubles. First, the contents of the memory may become corrupted. Second, the pointers to the head and tail of the FIFO may themselves be corrupted. In either event, the switch or router dispatches erroneous packets on to the network. These difficulties may be caused by a design fault, processing troubles, noise from the power supply and a variety of other causes.

Although various schemes exist for the monitoring of data packets in a network, so that an excessive occurrence of corrupt packets can be detected externally, such a method of detection does not necessarily locate a fault either to a particular unit and still less to a FIFO or particular FIFO within that unit. It is accordingly desirable to provide some convenient means within a FIFO store to detect misalignment or corruption of packets within the FIFO or of the pointers which control the writing and reading of data packets or other data in a FIFO store.

It is customary when writing data, particularly in the form of data packets, into a FIFO store to write a status word that contains sundry information regarding the data packet associated with the word. That information may determine the length of the packet so as to provide a control for the read pointer, and may include data such as a mask denoting the ports for which the packet is destined, data indicating the priority of the packet, VLAN tags conforming to IEEE Standard 802 1q and so on.

SUMMARY OF THE INVENTION

The present invention is based on the introduction into the writing process of a synchronisation pattern, which may be a synchronisation word or a recycling series of synchronisation words that are written in addition to the status word and data entry in the FIFO store. In a development of the invention the synchronisation word may include a representation of a destination port for the packet which is stored. When a data packet is read out from the memory, the present invention envisages, after the checking of the status word, a check that the synchronisation word conforms to a predetermined pattern. A check may also be made that the port number included in the synchronisation word matches the intended port. If the synchronisation word does not match a predetermined pattern then there is an indication that corruption has occurred. Including the port number is particularly beneficial when the memory is shared between a multiplicity of ports and avoids the problem of a corrupted pointer which by chance points to a valid packet destined for an incorrect port.

Upon detection of a misaligned or corrupted entry in the manner described, the transmission of packets may be terminated, to prevent the network receiving incorrect packets. In a preferred form of the invention, a processor within the unit may be interrupted and both the port and the FIFO can be re-initialised to default values before being re-enabled.

The scheme envisaged according to the present invention is useful as a comparatively simple solution to difficulties arising in high complexity chips. It enables in particular the cure of occasional problems that can be masked by software which re-initialises the relevant FIFO and the port to which it may be associated.

Further features of the invention will become apparent from the following description with reference to the accompanying drawings.

DETAILED DESCRIPTION

Figure 1:
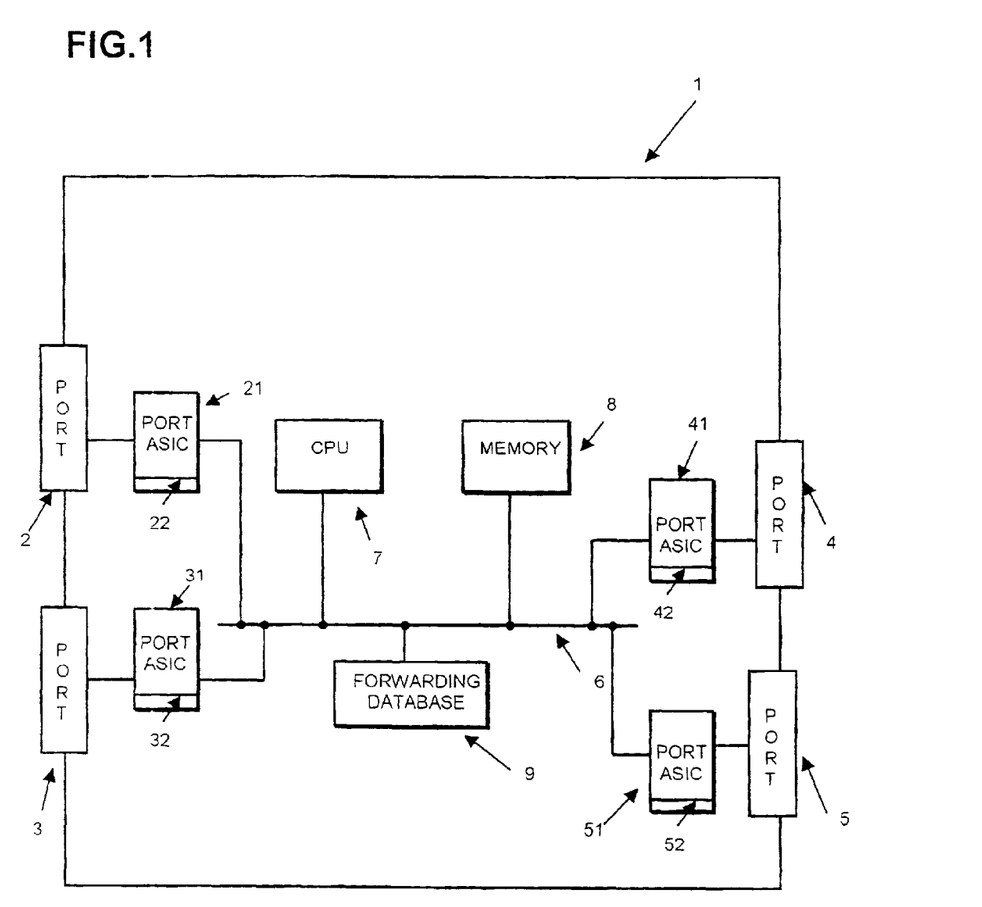
FIG. 1 illustrates in schematic manner a typical network switch within which the present invention may be incorporated.

FIG. 1 of the drawings illustrates in an exemplary and somewhat schematic manner a network unit which may operate as a switch or router. Such devices are well known in the art. The switch 1 shown in FIG. 1 is shown as having four ports 2, 3, 4 and 5. In a real example there may be a larger number such as 24 ports. The ports 2 to 5 are illustrated as associated with the respective port ASIC 21, 31, 41 and 51, each of which includes a respective FIFO 22, 32, 42 and 52 respectively. It is intended that the 'ports' 2 to 5 perform the functions of the 'physical layer' in the conventional OSI model whereas the port ASICs include media access control devices (MACs). Although the ports ASICs are shown as separately associated with respective ports, in current switches they may be part of a single ASIC.

The switch 1 includes a system of buses 6 for the conveyance of packet data and other signals such as control, status and management data across the switch. The switch includes a processor, constituted for example by a CPU 7, a central memory 8, which may be partly or wholly incorporated on an ASIC but typically is constituted by separate static or dynamic random access memory. The switch also includes a forwarding database 9

Typically, though this is given only by way of example, packets received at any of the ports are temporarily stored in receive FIFOs included within the FIFO systems 22–52 while a request is made for storage of the FIFO in central memory 8 pending the forwarding of any given packet to its destination port or ports. Very typically header information is read from a packet to extract source and destination addresses which are employed in a look-up process by recourse to the forwarding database 9 to determine which port or ports need to be selected for the forwarding of the packet. The establishment and operation of a forwarding database is well known in the art and need not be described in any detail here. The look-up result will be a bit mask of ports that the packet is destined for. A unicast packet would normally have just one bit set whereas multicast or broadcast packets will have several or all of the bits set. This bit mask will be written into a status word for the packet prior to the forwarding of the status word and the packet to the central memory 8.

Figure 2:
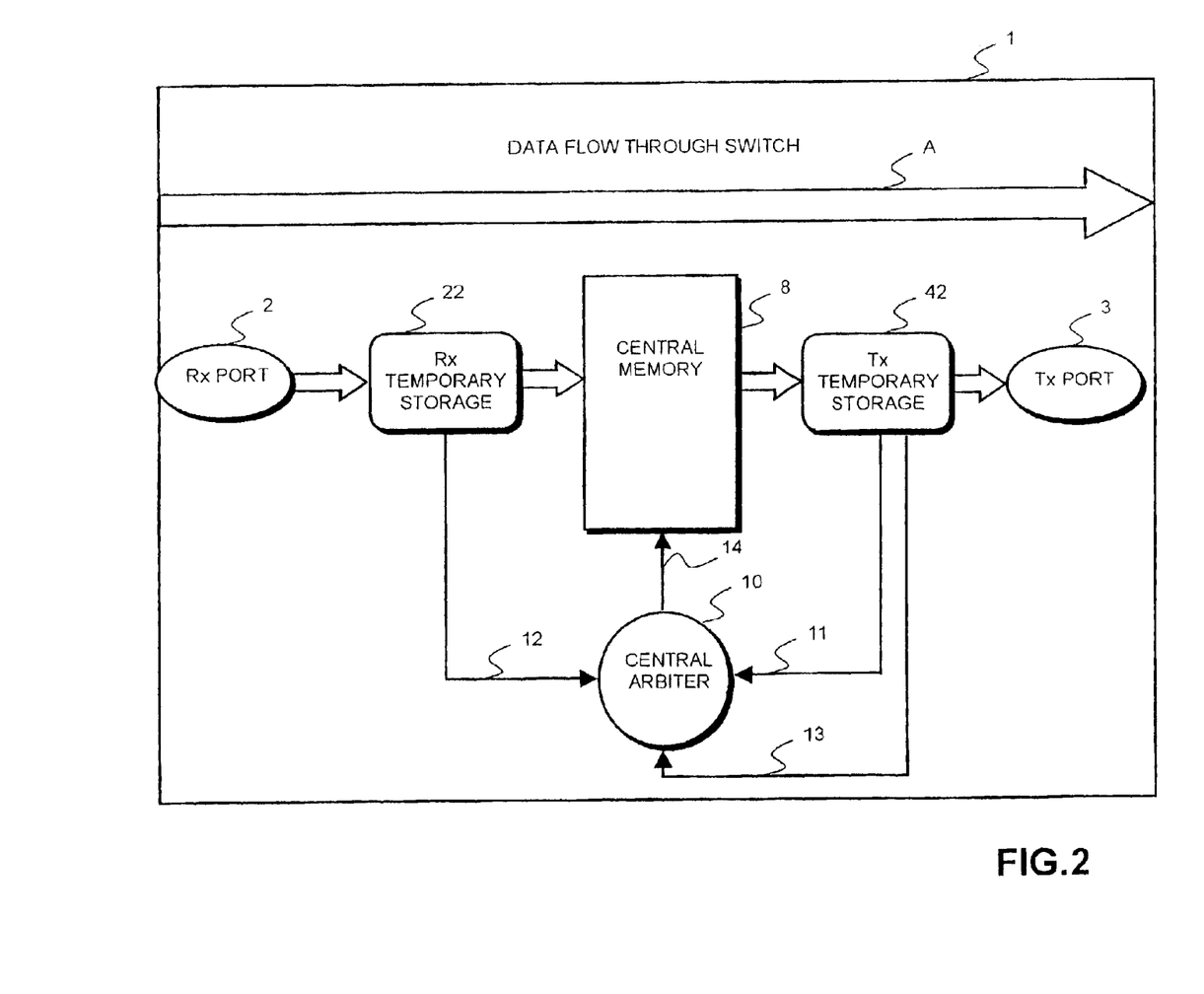
FIG. 2 illustrates a typical arrangement of memory in a network unit.

FIG. 2 illustrates by way of example the general relationship between the storage devices in switch 1. FIG. 2 shows, for a data flow in the direction of the arrow A through the switch 1, data packets proceeding from a receive port 2 to a temporary store 22 (which may be a FIFO) and thence into the central memory 8 from which packets are from time to time retrieved and in the case of a port 3 fed to a corresponding temporary store 42. FIG. 2 illustrates a central arbiter 10 (which may be constituted by programmed operation of the CPU 7) which receives memory requests 11 and 12 from the stores 22 and 24 and generates reading and writing requests 14 for the central memory 8. Again, FIG. 2 represents a known arrangement, described for example in GB-2350268, and does not warrant detailed description of the manner in which the various functions are performed.

Figure 3:
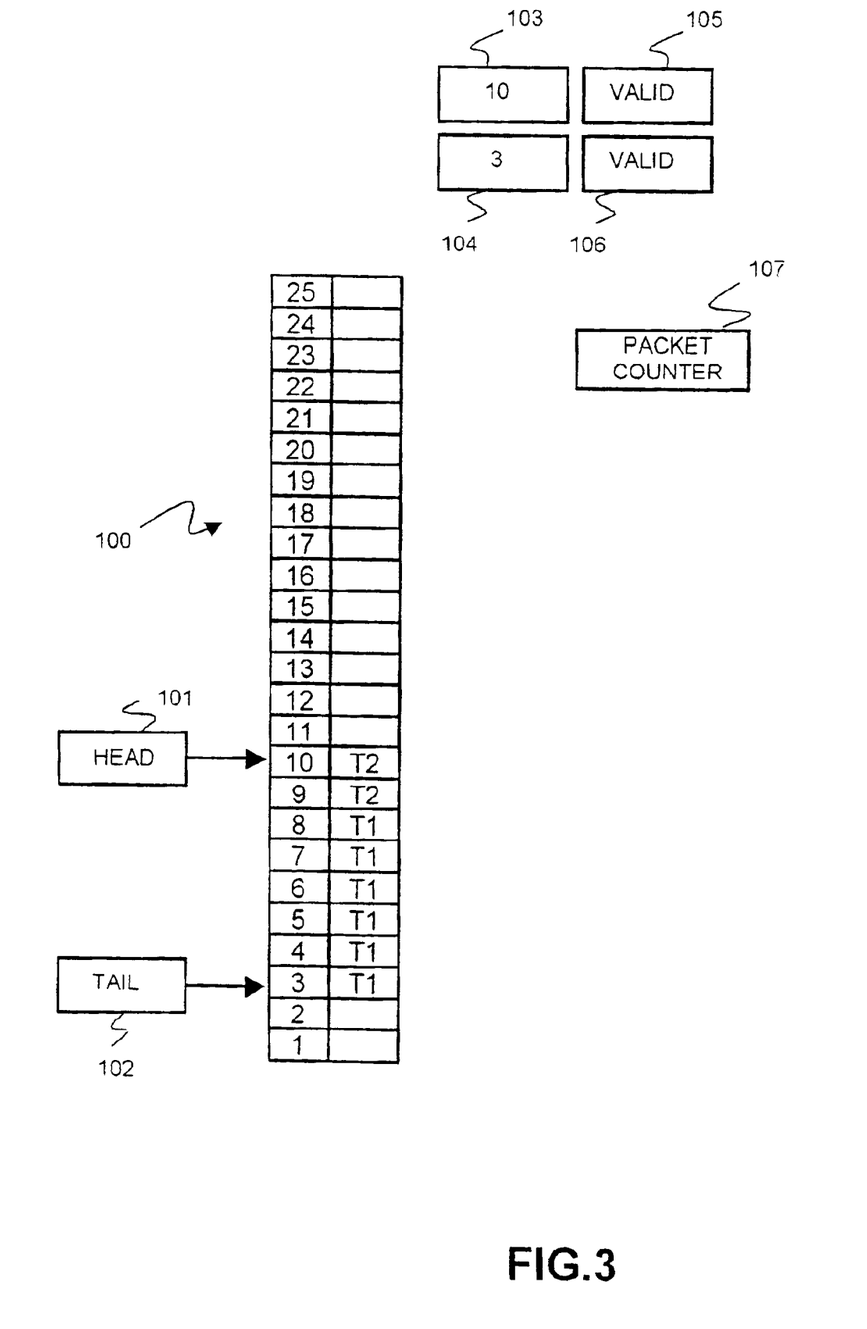
FIG. 3 is a diagram illustrating memory space defined to constitute a FIFO and associated pointers.

FIG. 3 illustrates a typical section of memory space 100 that is controlled, by means of pointers and associated software, to operate as a FIFO. The memory space has a multiplicity of storage locations, shown as 1 to 25, and the reading of data into the storage space is controlled by a head pointer, shown schematically as 101, and a tail pointer 102. The head pointer determines the point at which new data shall be written to the FIFO memory space and the tail pointer indicates the location at which data shall be read from the memory space. Different schemes are possible. For example, the head pointer may point to the next space at which data should be written and the tail pointer may point to the adjacent space but this is a matter of detail. In practice there may be additional pointers, not relevant to the present invention, as described for example in our co-pending application Ser. No. 9909026 8. The values of the pointers are held in respective registers which are controlled by the relevant read and write processes in the hardware. They may also be written under software control for the purpose of initialisation. In this particular example the head pointer 101 is held in a register 103 and the tail pointer is held in register 104. Registers 105 and 106 show the status of these pointers. In this example the head pointer is valid, shown by the entry in register 105 and is pointing to memory space '10' as shown by register 103. The tail pointer has a value '3' held in register 104 and is valid as shown in the validity register 106.

In FIG. 3, entries in the FIFO are shown by T1 and T2. FIG. 3 includes a packet counter 107 controlled as described with reference to FIGS. 5 and 6.

It is customary to advance the head pointer and the tail pointer in a cyclic manner through the memory space so that in the simple example given in FIG. 3, when the head pointer 101 reaches the memory space '25' it will re-circulate to memory space 1. The tail pointer will proceed likewise.

Figure 4:
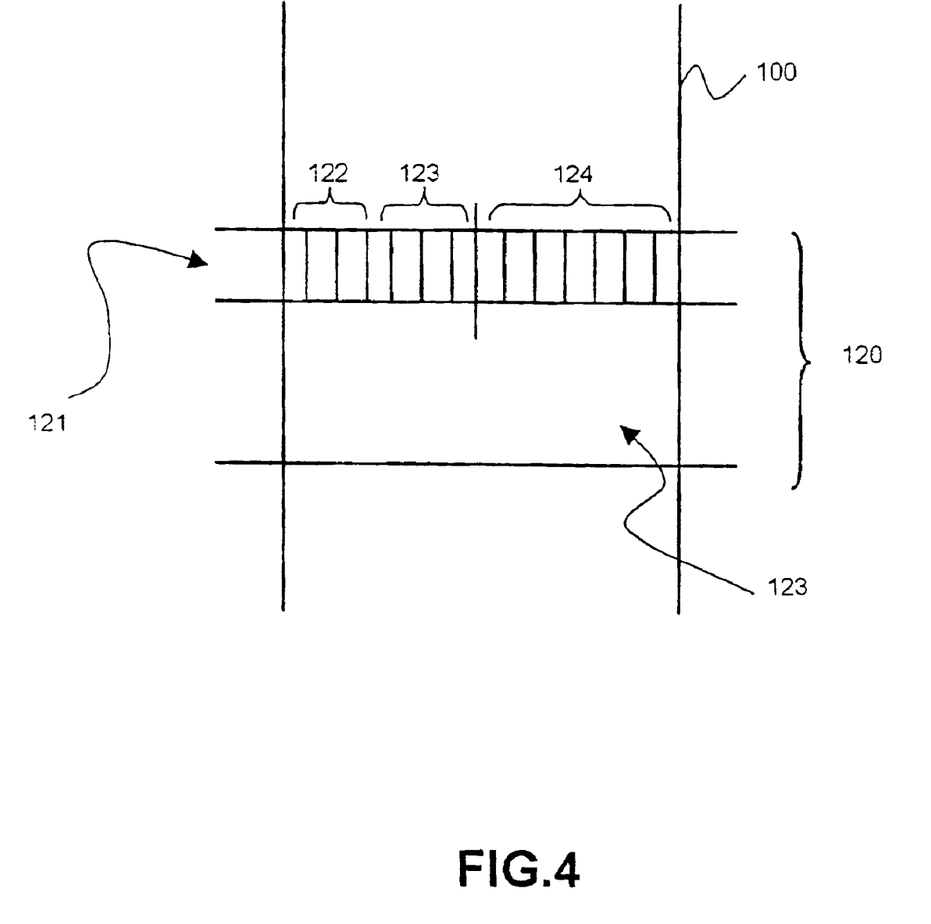
FIG. 4 illustrates an entry in the FIFO memory space according to the invention.

FIG. 4 illustrates an entry 120 constituting any one of the data entries in the FIFO memory space 100 shown in FIG. 3. The entry consists of a status word 121 which incorporates a status data 122, a port bit mask 123, a synchronisation word 124 and the associated data packet 123.

Figure 5:
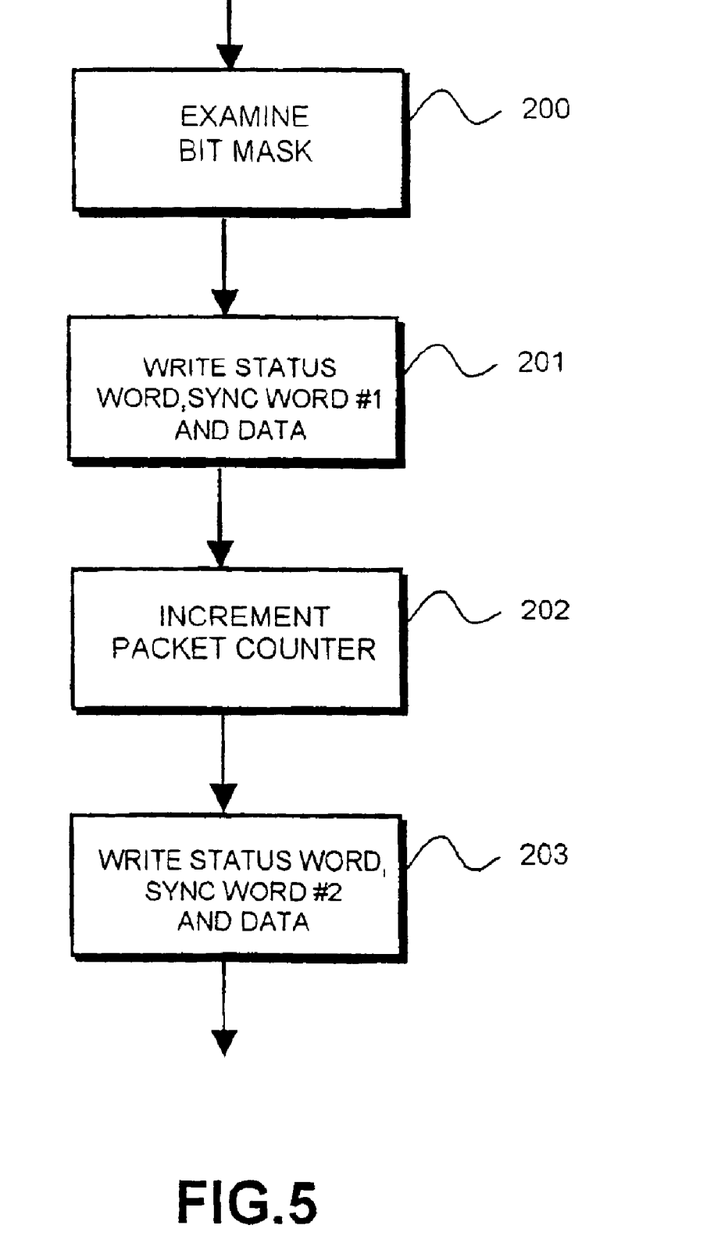
FIG. 5 illustrates a writing process.

FIG. 5 illustrates a typical writing process for the entries in the memory space. There may be a separate FIFO for each destination port or there may be one central memory divided between all ports. Firstly the destination port bit mask contained within the status word will be examined which will govern which FIFO or which part of the memory to write to. Then the status word the first of a pair of sync words and the relevant data will be written at stage 201. The head pointer will be advanced (as is usual) on each word written to the respective FIFO space. If there are multiple bits sets in the destination port bit mask then this process will be repeated for each one. For the sake of simplicity a counting loop for such a repeated process is omitted. On the second packet written to memory then the respective status word, a second of a pair of sync words and the data will be written at stage 203. In this example it is assumed that the sync word alternates between successive writings. A packet counter for each destination port is maintained so that an indication to the read process can be made when there is a packet available for reading. The counter is incremented on completion of writing the packet to memory (stage 202).

The sync word is preferably alternated, or cycled in a set of words to facilitate distinguishing between the sync pattern and fixed data patterns used for listing.

Figure 6:
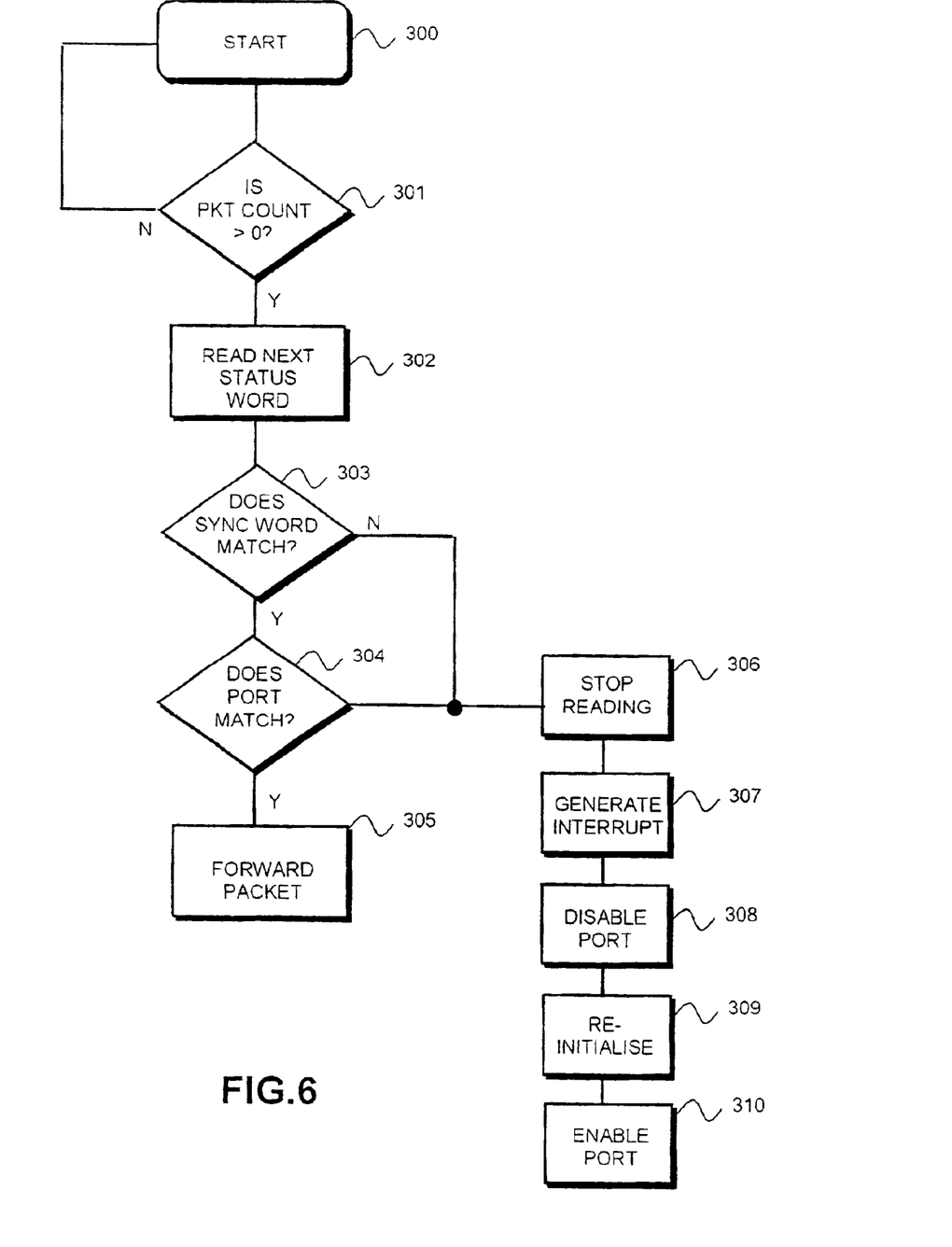
FIG. 6 illustrates a reading process.

FIG. 6 illustrates the reading process. From a start stage 300, the packet counter is checked. If the packet count for the port is greater than zero then there is a complete packet in memory available for reading. The next status word (indicated by the tail pointer) is read from memory stage 302. If the sync word matches one of the two correct patterns (stage 303) and the port's bit is set in the destination port bit mask (stage 304) then the packet will be transmitted out of the port (stage 305). If the sync word does not match the relevant pattern or the port is not in the destination port bit mask then reading of the packet will cease (stage 306). The read process will then go into an error state where it will not read any further packets until it has been re-initialised. An interrupt will be generated to the CPU, stage 307. The software will then disable the port (stage 308), all packets currently in the switch destined for that port will be lost, the FIFO head and tail pointers will be re-initialised, stage 309, and finally the port will be re-enabled (stage 310).

This process not only detects error due to corrupt pointers but also identifies the location of the fault. It would be possible, particularly if trunking or link aggregating is employed in accordance with IEEE Standard 802.3ad, to reconfigure the switch so as not to employ the relevant port and FIFO.

What is claimed is:

1. A method of operating a FIFO memory to store and retrieve data packets, comprising the steps of providing a head pointer indicating progressively where entries are to be written to the FIFO memory, providing a tail pointer indicating progressively where entries are to be read from the FIFO memory, for each packet stored in the memory, writing a status word including status data and a sync pattern, for each packet to be read from the memory, reading the respective status word, determining whether the sync pattern matches a predetermined sync pattern; and (i) forwarding the packet when said status word meets predetermined criteria including match between the sync pattern and said predetermined sync pattern, (ii) preventing forwarding of said packet when said status word fails to meet said predetermined criteria.

2. A method according to claim 1 including writing, for each packet, a corresponding bit mask and wherein said predetermined criteria include a match between a predetermined port and a port indicated by the bit mask.

\* \* \* \* \*

UNITED STATES PATENT AND TRADEMARK OFFICE
CERTIFICATE OF CORRECTION

PATENT NO.   : 6,839,360 B2
DATED        : January 4, 2005
INVENTOR(S)  : Allwright et al.

It is certified that error appears in the above-identified patent and that said Letters Patent is hereby corrected as shown below:

Title page,
Insert Item -- [30]    Foreign Application Priority Data:
            December 14, 2000 [GB]      Great Britain ………..0030446.9 --

Signed and Sealed this

Tenth Day of May, 2005

JON W. DUDAS
*Director of the United States Patent and Trademark Office*